US006556544B1

United States Patent
Lee (10) Patent No.: US 6,556,544 B1
(45) Date of Patent: Apr. 29, 2003

(54) METHOD AND SYSTEM FOR PROVISIONING NETWORK RESOURCES FOR DYNAMIC MULTICAST GROUPS

(75) Inventor: Cheng Y. Lee, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/422,646

(22) Filed: Oct. 22, 1999

(51) Int. Cl.[7] .............................................. H04L 12/28
(52) U.S. Cl. .................... 370/256; 370/390; 370/400; 370/408
(58) Field of Search ................................. 370/389, 390, 370/392, 393, 400, 401, 432, 408, 469, 475, 230, 235, 237, 238, 255, 256

(56) References Cited

U.S. PATENT DOCUMENTS

| | | | | |
|---|---|---|---|---|
| 5,331,637 A | * | 7/1994 | Francis et al. | 370/256 |
| 5,825,772 A | | 10/1998 | Dobbins et al. | 370/396 |
| 5,831,975 A | | 11/1998 | Chen et al. | 370/256 |
| 5,835,723 A | | 11/1998 | Andrews et al. | 395/200.56 |
| 5,903,559 A | * | 5/1999 | Acharya et al. | 370/254 |
| 5,940,391 A | | 8/1999 | Malkin et al. | 370/390 |
| 6,078,590 A | * | 6/2000 | Farinacci et al. | 370/400 |
| 6,483,805 B1 | * | 11/2002 | Davies et al. | 370/235 |

OTHER PUBLICATIONS

Blake et al, An Architecture for Differentiated Services, RFC 2475, pp. 1–29, Dec. 1998.*
Deering et al, The PIM Architecture for Wide–Area Multicast Routing, IEEE, pp. 153–162, 1996.*
Lee et al, Controlling the number of egress points in dynamic multicast groups, Internet Draft, pp. 1–10, Oct. 1999.*
Lee, Provisioning Resources for Multicast Traffic in a Differentiated Service Network, Internet Draft, pp. 1–13, Oct. 1999.*
Lee et al, Engineering paths for Multicast Traffic, Internet Draft, pp. 1–14, Oct. 1999.*

* cited by examiner

*Primary Examiner*—David Vincent
*Assistant Examiner*—Frank Duong
(74) *Attorney, Agent, or Firm*—Kent Daniels; Ogilvy Renault

(57) ABSTRACT

A system for provisioning a dynamic multicast group over a differentiated services (DS) network includes an a plurality of edge nodes, each of which includes a respective multicast traffic engineering entity. An ingress node is adapted to serve as a source of data traffic of the dynamic multicast group. An egress node is adapted to serve as a sink of the data traffic of the dynamic multicast group. The multicast traffic engineering entity of the egress node is adapted for receiving information respecting a predetermined service level specification (SLS) of the dynamic multicast group; and provisioning a distribution path from the egress node back to the ingress node, on the basis of the received information respecting the SLS. In a method of the invention, information respecting a predetermined service level specification (SLS) of the dynamic multicast group is received at the egress node; and the distribution path is provisioned from the egress node back to the ingress node, on the basis of the received information respecting the SLS. The advantage is reliable automated provisioning of dynamic multicast trees in differentiated service networks.

36 Claims, 4 Drawing Sheets

METHOD AND SYSTEM FOR PROVISIONING NETWORK RESOURCES FOR DYNAMIC MULTICAST GROUPS

CROSS-REFERENCE TO RELATED APPLICATIONS

This is the first application filed for the present invention.

MICROFICHE APPENDIX

Not Applicable.

TECHNICAL FIELD

The present invention relates to multicast services, and in particular to a method and system for provisioning network resources for dynamic multicast groups.

BACKGROUND OF THE INVENTION

The recent evolution of communication networks (e.g. the Internet) has been accompanied by increasing demand by users for delivery of multi-cast services over such networks. Multicast services include, for example, news or entertainment content, which is transported over the networks from a single source to a plurality of sinks. In this context, a source may be a server at the network edge acting as a source of the content; or an edge node serving as a gateway between affiliated sub-networks, through which the content (which originates elsewhere) is supplied to the sub-network. Similarly, a sink node may be an end-user's communication device (e.g. a personal computer [PC] connected to the network via a modem); or an edge node which serves as a gateway between affiliated sub-networks, and through which the content (having been transported across the sub-network from the source) is supplied to an adjacent sub-network.

In order to enable multicast transport of content, a network provider (NP) must provision the network with both physical and service resources having sufficient band-width capacity and buffers. Physical resources are provisioned by installation of the physical plant used to construct the network fabric. Since changes in the physical resources necessarily involves the installation of new hardware, such changes are generally expensive, and consequently infrequent. Network providers typically utilize various known methods for predicting future bandwidth capacity requirements, and attempt to deploy physical plant having sufficient excess capacity to satisfy anticipated growth in demand for forecast service offerings. However, at least during any specific multicast session, the total available resources (i.e. link band-width and buffers) are fixed, and these may be logically allocated (typically allocation of bandwidth capacity and buffers) to multiple communications sessions (or data transport paths) up to a practical limit of the band-width and buffer capacity of the resource.

The logical allocation of resources for any communication session is normally conducted during set-up of a data transport path across the network. Various methods are known for service resource allocation, such as, for example, resource reservation protocol (RSVP) and constrained routing-label distributed protocol (CR-LDP). In each case, an end-to-end path across the network between source and sink nodes is first negotiated, and then transport resources along the path are allocated in accordance with a service requested for the communication session. In a situation where the allocation of resources to satisfy the service requested exhausts (or exceeds) the practical capacity of any element (e.g. a node or link) in the path (given pre-existing resource allocations for other communications sessions already utilizing that element), then the path must be abandoned, and the process of path setup and provisioning restarted.

Known service resource allocation methods are well suited to unicast, and predetermined point-to-predetermined point (i.e. 1-to-1, in which both source and sink nodes are predetermined and static) connections across the network. In such cases, it is a simple matter to set up a path and allocate resources during set-up of the connection. These methods can also be used effectively for multicast groups in which source and sink nodes are predetermined and static (i.e. 1-to-Many, in which all nodes are predetermined and static) because resource requirements can be accurately predicted prior to setting up the multicast tree. However, in cases where a multicast group is dynamic (i.e. in which any edge node of the network may serve as a sink node, and/or new sink nodes may join or leave the group during a multicast session), the network must be logically provisioned to provide for "1-to-Any" distribution, and it is therefore very difficult to predict provisioning requirements a priori.

In order to service a dynamic multicast group, the network provider must hypothesize probable delivery paths for the multicast traffic, and estimate the service resources required in the network. Because the egress nodes in a multicast group can be dynamic, this can result in:

multicast traffic not being delivered at a service level agreed to if parts of the network utilized by a multicast group lack adequate service resources; or under-utilization of network resources if the network provider over-estimates the bandwidth capacity required for multicast traffic in a portion of the network.

In addition, individual egress nodes in a multicast group may experience very different service levels, depending on whether their respective distribution paths "hit" or "miss" adequately provisioned portions of the network. If on the other hand the network service provider chooses to distribute resources in potential paths from any ingress node to all possible egress nodes, then the multicast traffic may be delivered consistently below a service level contracted for in a SLS.

Accordingly, there remains a need for a method and apparatus that enable network resources to be allocated to a dynamic multicast group, such that multicast traffic associated with the group can be delivered at a service level required by a SLS associated with the multicast.

SUMMARY OF THE INVENTION

An object of the present invention is to provide a method and system for provisioning a distribution path of a dynamic multicast group, such that multicast traffic can be delivered through the distribution path at a service level required by an SLS associated with the dynamic multicast group.

A further object of the present invention is to provide a method and system for provisioning a distribution path of a dynamic multicast group, in which multicast traffic can be delivered to each member of the dynamic multicast group at the same service level.

Accordingly, an aspect of the present invention provides a method of provisioning a distribution path of a multicast tree between an ingress node and an egress node in a dynamic multicast group in a differentiated services (DS) network, the method comprising the steps of: receiving information respecting a predetermined service level specification (SLS) for the dynamic multicast group; and provisioning the distribution path from the egress node back to the ingress node, on the basis of the received information respecting the SLS.

Another aspect of the present invention provides a edge node for receiving a multicast traffic of a dynamic multicast group transmitted over a differentiated services (DS) network from an ingress node, the edge node comprising a multicast traffic engineering (MCTE) entity adapted for: receiving information respecting a predetermined service level specification (SLS) of the dynamic multicast group; and provisioning a distribution path from the edge node back to the ingress node, on the basis of the received information respecting the SLS.

A further aspect of the present invention provides a system for provisioning a distribution path of a dynamic multicast group over a differentiated services (DS) network. The system comprises an ingress node adapted to serve as a source of data traffic of the dynamic multicast group; and an egress node adapted to serve as a sink of the data traffic of the dynamic multicast group. The egress node comprising a multicast traffic engineering (MCTE) entity adapted for: receiving information respecting a predetermined service level specification (SLS) of the dynamic multicast group; and provisioning a distribution path from the egress node back to the ingress node, on the basis of the received information respecting the SLS.

In an embodiment of the invention, information respecting the SLS includes resource requirement information defined for the multicast group. Preferably, the SLS information is received by receiving, at the multicast traffic engineering (MCTE) entity, a message including the SLS information. Preferably, a query message is received from the egress node. A response including the SLS information is subsequently sent to the multicast traffic engineering (MCTE) entity of the egress node in response to the query message. In embodiments of the invention, the query message can be received by any one or more of the ingress node or an SLS database server.

Preferably, each hop of the distribution path is provisioned, in sequence, starting from the egress node and progressing toward the ingress node.

In an embodiment of the invention, each hop of the distribution path is provisioned by: forwarding a graft message toward a root of the multicast tree; receiving the graft message at a network element intermediate the ingress node and the egress node; and allocating resources of the network element to the distribution path. Preferably, a forwarding state of the network element is also set to enable forwarding of multicast traffic toward the egress node.

In preferred embodiments of the invention, the graft message is forwarded from the egress node toward the root of the multicast tree along a route traversed by the distribution path as its is provisioned. Preferably, the route is determined in accordance with any one or more of: a shortest path route between the egress node and the ingress node; a constraint based routing (CBR) table including predetermined path routing information defined by a network provider; an explicit routing object (ERO) including predetermined path routing information defined by a network provider; and a path discovery algorithm.

Preferably, information of the route is determined by the egress node and included in the graft message.

In an embodiment of the invention, when the network element is carrying multicast traffic of the multicast group, a forwarding state of the network element is set to enable forwarding of the multicast traffic to the egress node; and the graft message is terminated.

In an embodiment of the invention, when a second ingress node joins the dynamic multicast group: information respecting the predetermined service level specification (SLS) for the dynamic multicast group is obtained; and the distribution path is re-provisioned, from the second ingress node toward each egress node of the dynamic multicast group, on the basis of the received information respecting the SLS. In this case, information respecting the SLS can be obtained by sending a query message to one or more of the ingress node and an SLS database server.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
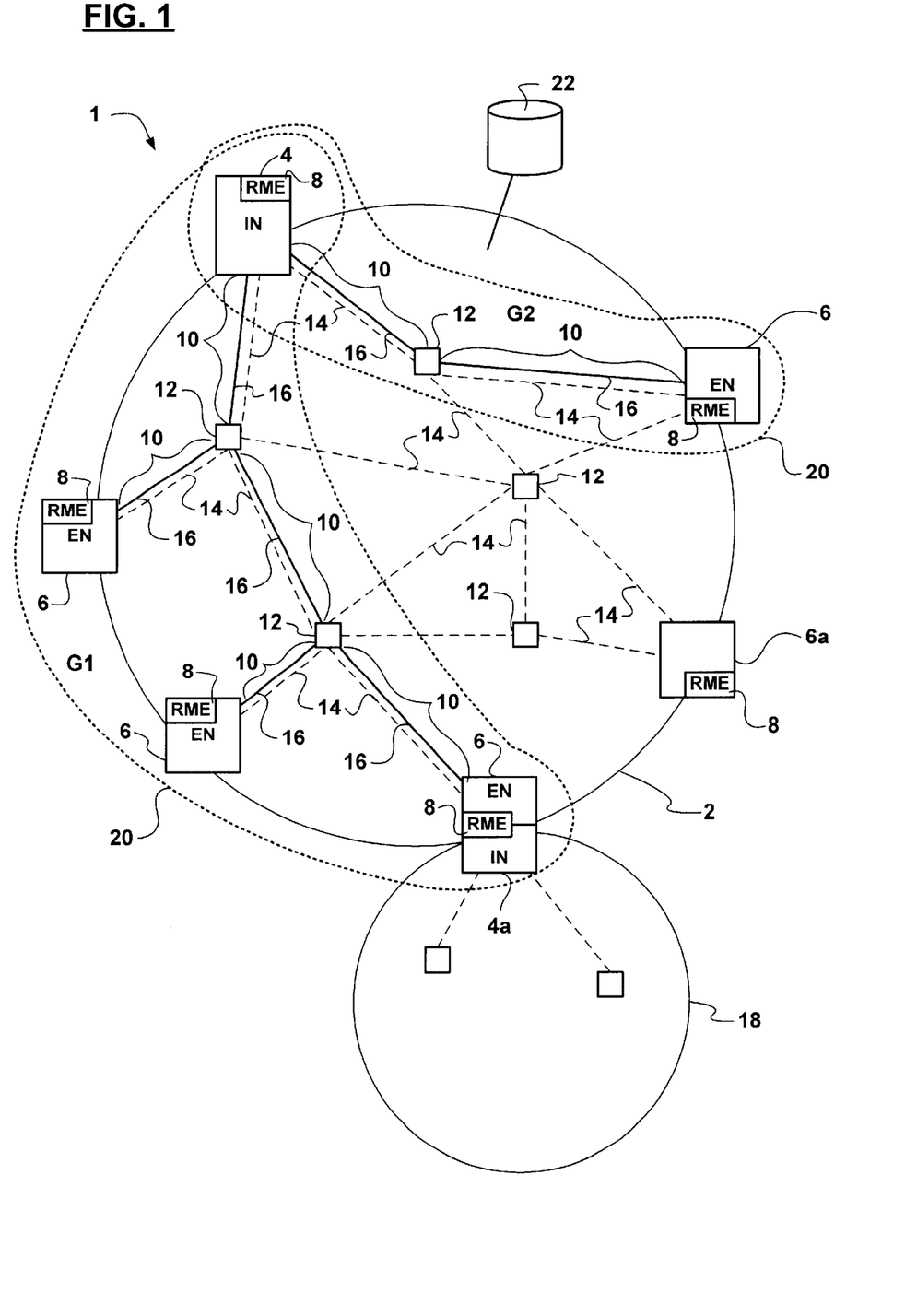
FIG. 1. schematically illustrates a system in accordance with an embodiment of the present invention deployed over a differentiated service (DS) network.

Referring to FIG. 1, the present invention provides a system 1 for distributing multicast data traffic over a differentiated services (DS) network 2. The system 1 comprises an ingress node 4 and a plurality of egress nodes 6 (four are shown in the illustrated embodiment), all of which are nodes located at the network edge, and include a respective multicast traffic engineering (MCTE) entity 8. The network 2 can, for example, be a local area network (LAN), wide arc network (WAN), the Internet, an Intranet, or a sub-network of any of the foregoing. The ingress node 4 serves as a source of multicast data traffic transmitted over the network 2. The data traffic may actually originate at the ingress node 4, or may originate elsewhere. Similarly, each egress node 6 serves as a sink for the multicast data traffic. The data traffic may terminate at an egress node 6, or may be retransmitted to other downstream network elements or end-user communication devices.

In general, an egress node 6 may be directly connected to the ingress node 4 over the network 2. However, more typically, a distribution path between ingress and egress nodes 4,6 will involve two or more hops 10 and at least one intervening network element (NE) 12, such as a router or a switch. In FIG. 1, physical connections (i.e. network links) 14 are illustrated in dashed lines, while path segments 16 (forming the distribution paths over which multicast traffic is transported) are illustrated by solid lines.

The multicast data traffic can originate at the ingress node 4, or at a content server (not shown) connected to the ingress node 4. Alternatively, ingress node 4 may operate as a gateway connecting the network to an adjacent up-stream sub-network (not shown), and sources multicast data traffic which originates outside the network 2 (e.g. on the adjacent upstream sub-network, or on a still further upstream sub-network). In either case, each egress node 6 may be a discrete termination point for the multicast data traffic, or may also be a gateway connecting the network to an adjacent downstream sub-network 18 (so that the egress node 6 in question serves as an ingress node 4a of that downstream sub-network 18).

Figure 2A:
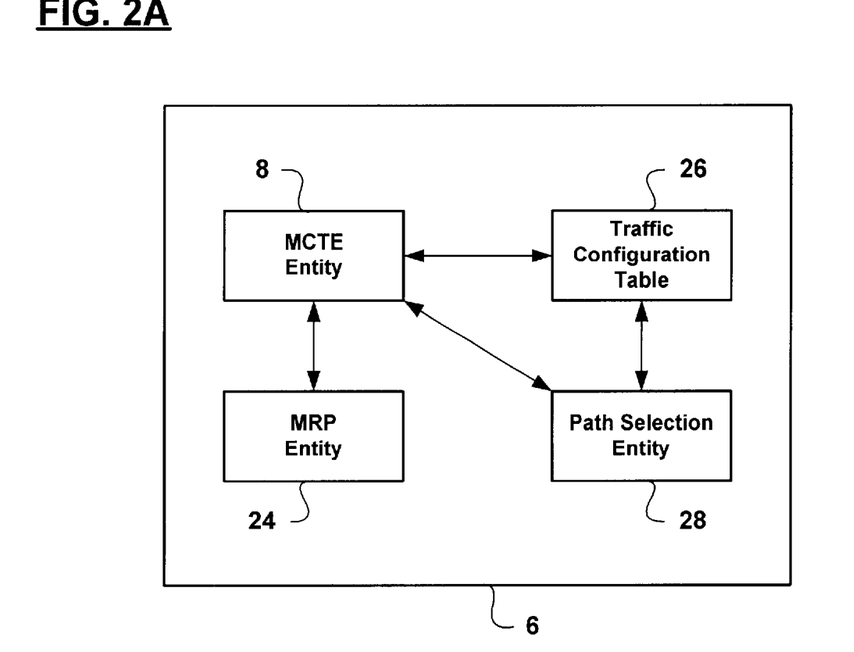
FIGS. 2a and 2b are block diagrams schematically illustrating components of an egress node and a network element, respectively, in accordance with an embodiment of the present invention.

As shown in FIG. 2a, each egress node 6 generally comprises a multicast traffic engineering (MCTE) entity 8, a multicast routing protocol (MRP) entity 24, a traffic configuration table 26 and a path selection entity 28. The MRP entity 24 is preferably a conventional MRP. The traffic configuration table 26 is preferably adapted to store data of multicast groups 20, including, for example, resource requirements and distribution path information). The path selection entity 28, which may be resident in the egress node 6 or in a server (not shown) accessible by the egress node 6, is preferably adapted to obtain distribution path routing information based on ingress node 4 and end user address information supplied by the MCTE entity 8. The path selection entity 28 may obtain the distribution path routing information using any one or more of: conventional routing tables; constraint based routing (CBR) tables; explicit path definitions predetermined by the network provider; and path discovery algorithms.

Figure 2B:
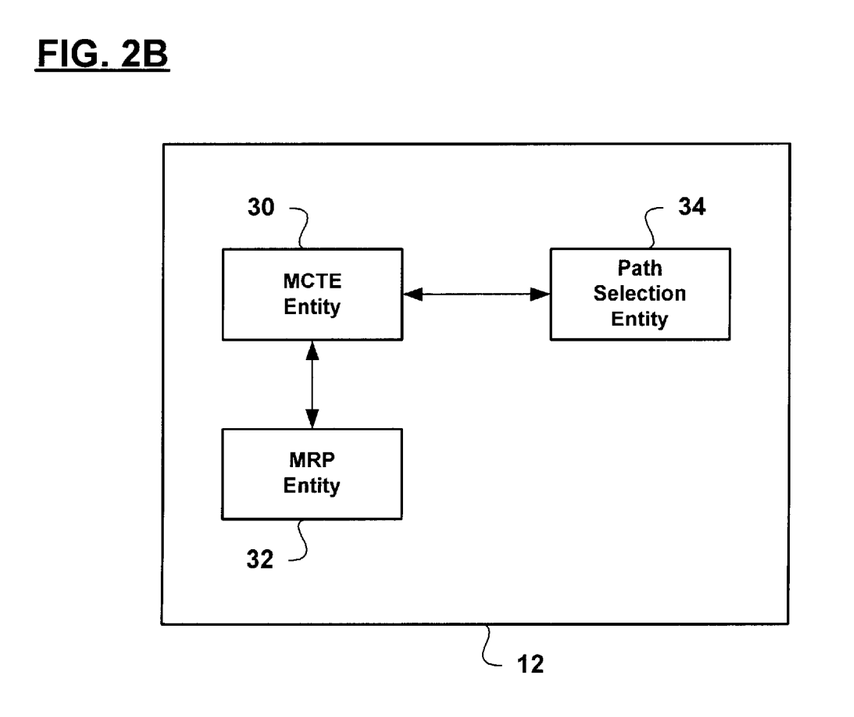

Similarly, each network element 12 comprises a multicast traffic engineering (MCTE) entity 30, a multicast routing protocol (MRP) entity 32, and a path selection entity 34. The MRP entity 30 is preferably a conventional MRP. The path selection entity 34 is preferably adapted to obtain distribution path routing information based on information contained in graft messages propagated from the egress node 6. The path selection entity 28 may also obtain the distribution path routing information using any one or more of: conventional routing tables; constraint based routing (CBR) tables; explicit path definitions predetermined by the network provider; and path discovery algorithms.

In an embodiment of the invention, each egress node 6 is a member of one or more dynamic multicast groups 20.

In the context of the present invention, the term "multicast group" refers to a group of two or more edge nodes including one or more ingress nodes 4, and one or more egress nodes 6 which are connected to receive multicast data traffic from the ingress node(s) 4. A "dynamic multicast group" 20 is a multicast group in which one or more egress nodes 6 may join or leave the group 20 during the multicast session. Additionally, a dynamic multicast group 20 includes a respective service level agreement (SLA) defining contract terms and conditions (including a service level specification—SLS) for multicast data transport across the network. This SLA is preliminarily negotiated by the network service provider and a content provider, and is instantiated in association with the dynamic multicast group 20 at the start of a multicast session.

Preferably, dynamic multicast groups 20 are differentiated by the service level (e.g. band-width and/or quality of service—QoS) delivered to the egress nodes 6 forming the group 20. Thus all egress nodes 6 in a group 20 receive the same service level. This arrangement avoids difficulties associated with distributing data traffic to the group 20 with differing service levels, such as, for example, the need to re-label (e.g. demote) data packets at network elements 12 intermediate the ingress and egress nodes 4, 6. It should be noted that more than one multicast group 20a–b can be attached to a single multicast tree (branching at the ingress node 4), and thus participate in a common multicast session, as shown in FIG. 1. In this case, data packets of the multicast session are be labeled in accordance with the SLS of each group 20a–b at the ingress node 4, so that differing service levels can be delivered to each respective group 20a–b subtending the ingress node 4.

As mentioned above, the process of constructing a distribution path proceeds hop-by-hop from the joining node 6a back toward the ingress node 4. This process is conveniently driven by the multicast traffic engineering (MCTE) entity 8 of the joining node 6a on the basis of information received from the ingress node 4 and/or the SLS database server 22.

Figure 3:
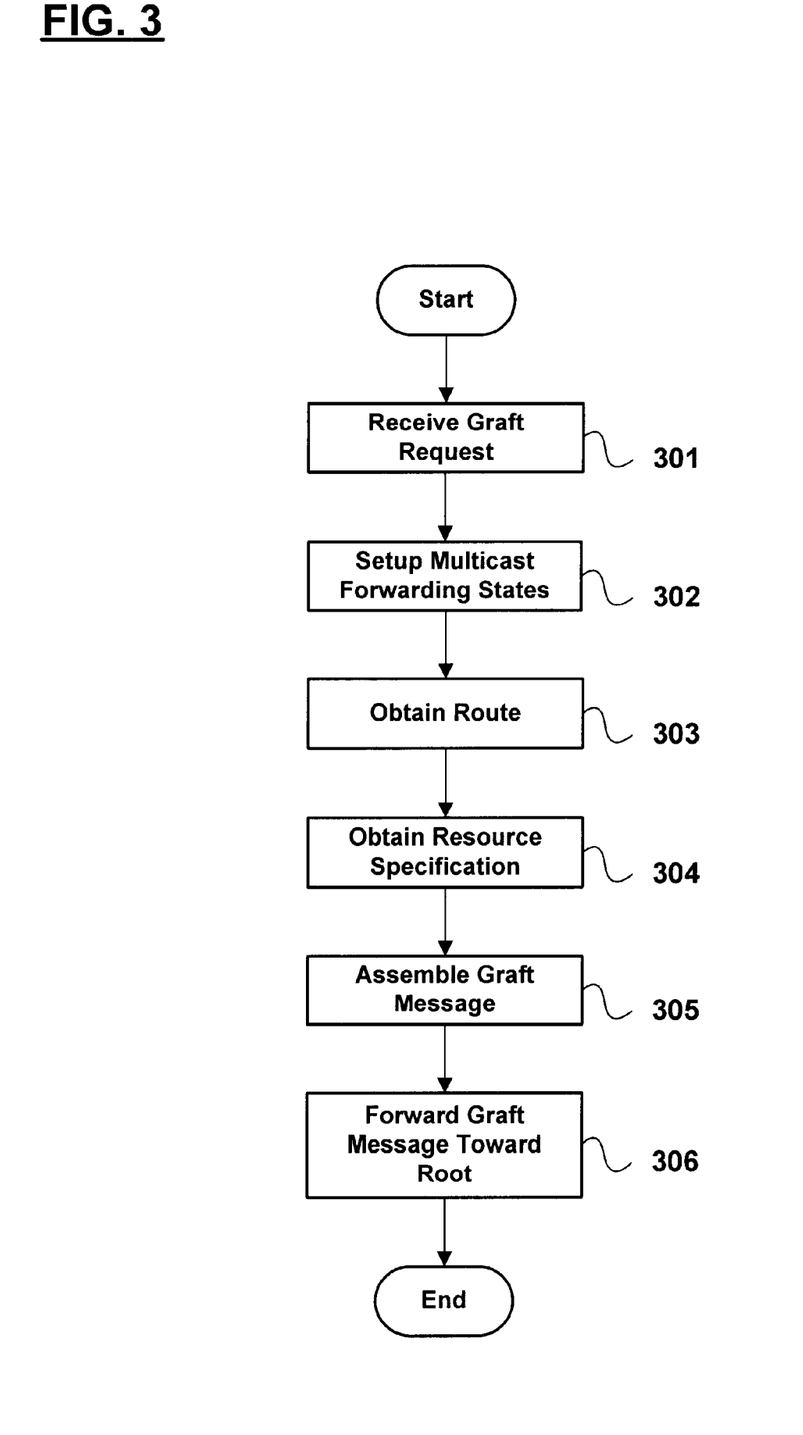
FIG. 3 is a flowchart illustrating exemplary steps executed by components of a joining node to initiate construction of a distribution path in accordance with an embodiment of the present invention.

As shown in FIG. 3, the process of constructing a distribution path is initiated (step 301) when the joining node 6a receives a graft request message (e.g. from a downstream network element or an end-user's communication device (host) connected to the joining node 6a). The graft request message preferably has a conventional format recognized by standard multicast routing protocols (MRPs), and includes control message IP (CMIP) fields for controlling provisioning of the distribution path. In the context of the present invention, the (CMIP) fields are considered to be Internet Protocol (IP) fields of interest. Exemplary fields of interest are: IP addresses of the ingress node and the destination (e.g. the end-user's communication device), and a group ID of the multicast group 20. These CMIP fields preferably match the standard control messages of known routing protocols (e.g. PROTO_ID=PIM~SM/CBT, destination=root prefix/well known multicast address, TOS=codepoint).

The multicast routing protocol (MRP) entity 24 of the joining node 6a processes the graft request message (step 302) to set up multicast forwarding states of the joining node 6a so that multicast traffic can be forwarded by the joining node 6a to the end-user. If multicast forwarding states already exist in respect of the group 20, then the graft request message is discarded. Otherwise, the MRP entity 24 accesses the MCTE entity 8 to obtain a constraint route or an Explicit Routing Object (ERO) containing route information for guiding construction of the distribution path (step 303). This function triggers the path selection entity 28 which obtains a first hop from a conventional routing table if no path selection algorythm is specified. Otherwise, it returns the ERO from the traffic configuration table 26 or builds the ERO object by returning the route(s) computed for the FEC data based on a predetermined path selection algorythm. Path selection algorythms can be based on: a static (e.g. explicitly defined routing) table; a constraint based routing (CBR) table; or a path selection (discovery) algorithm. The ERO is conveniently saved in the traffic configuration table 26, along with the CMIP data, for future use.

The MCTE entity 8 also obtains the resource requirements of the multicast group 20 (step 304). Preferably, this is accomplished by forwarding a query message (which may include a router alert), to either the ingress node 4 or an SLS database server 22. The query message preferably includes a group ID identifying a desired dynamic multicast group 20, along with other optional parameters. Exemplary optional parameters include a band-width capacity of the joining node 6a (and/or an end-user's communication device), and an end-user ID.

Upon receipt of the query message, the ingress node 4 (or SLS database server 22) formulates a response message for transmission to the joining node 6a. The response message may contain information of any one or more of: a "join permission" indicating that the joining node 6a is permitted to graft to the multicast tree; a group ID identifying a multicast group 20 to which the joining node 6a may be grafted; and information respecting the SLS (e.g. a resource requirement) of that group 20. At a minimum, the response message contains information respecting the SLS of the multicast group 20 so that appropriate resources can be allocated for each hop 10 of the distribution path as it is built.

The information contained in the response message sent to the joining node 6a can be used by the multicast traffic engineering entity 8 of the joining node 6a to govern the level of service (if any) delivered to the end-user. The response message may also contain information of network elements 12 already carrying data traffic of the multicast group 20, and/or preferred distribution paths across the network 2, which may be used to optimize the process of adding path segments 16 to the distribution path as it is constructed.

After the multicast forwarding states are setup and the route information obtained by the MCTE entity 8, the MRP entity 24 formulates and forwards a graft message (steps 305 and 306) towards the root of the multicast tree, via the MCTE entity 8. Preferably, the graft message formulated by the MRP entity 24 is conventionally formatted. The MCTE entity 8 adds an MCTE header to the graft message before it is sent. Preferably, the MCTE header contains the CMIP fields; the ERO containing route information; resources required by the multicast group 20; and the IP protocol ID of the graft message. The IP protocol ID is preferably set to "IPPROTO-MCTE", which can be recognized by network elements 12 along the distribution path as it is being set up. To facilitate handling of the graft message by these network elements 12, the graft message can be labeled as a router alert. Additionally, the MCTE entity 8 allocates resources of the joining node to the distribution path in accordance with the traffic configuration table 26.

The explicit routes defined in the ERO are removed as the graft message traverses the explicit path towards the root, in the same manner as described in the constrained routing-label distribution protocol (CR-LDP) and traffic engineering—resource reservation protocol (TE-RSVP).

Figure 4:
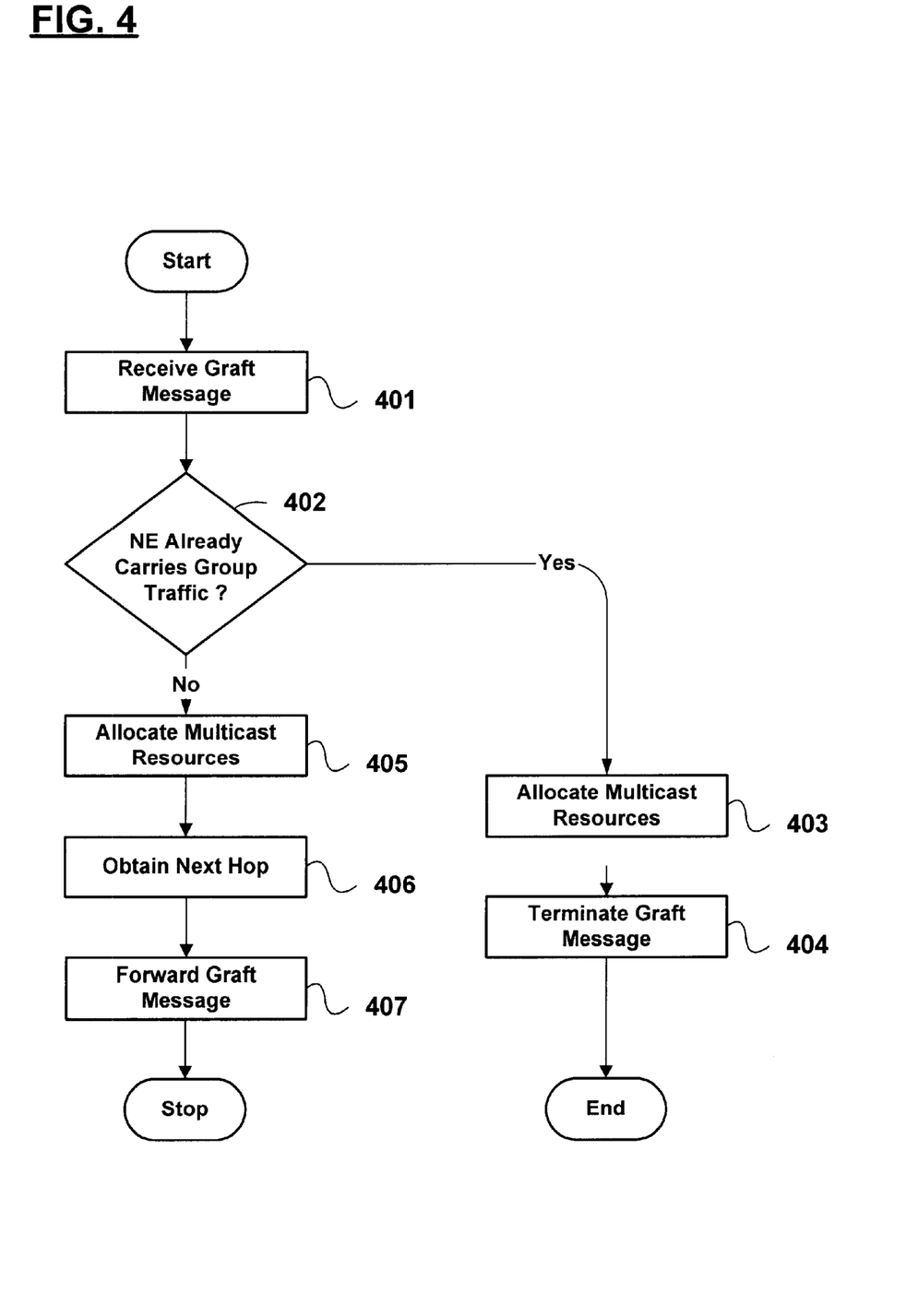
FIG. 4 is a flowchart illustrating exemplary steps executed by components of a network element intermediate a joining node and an ingress node during construction of a distribution path in accordance with an embodiment of the present invention.

Referring now to FIG. 4, when a network element 12 on a hop 10 (intermediate the ingress and joining nodes 4, 6a) receives the graft message (step 401), it is recognized by the network element 12 (e.g. on the basis of the IP protocol ID), removed from the forwarding path, and directed to the MCTE entity 30 of the network element 12. If the network element 12 is already carrying multicast traffic of the selected group 20 (step 402), then traffic forwarding states of the network element 12 are set to enable traffic forwarding to the egress node 6a (step 403), and the graft message is terminated (step 404).

Otherwise, the MCTE entity 30 extracts resource requirement data from the graft message and allocates (step 405) resources of the network element 12 in accordance with the resources required by the multicast group 20. The MCTE entity 30 also creates a transient "MCTE state" for the graft message (and other objects e.g. ERO—route information, Traffic). The appropriate multicast routing protocol (MRP) entity 32, as determined by the protocol ID in the graft message, is then invoked.

The MRP entity 32 creates the forwarding state for the group 20, to enable forwarding of traffic toward the joining node 6a, and forwards the graft message towards the root. As in the joining node 6a (see FIG. 3), the next hop towards the root is obtained by the MCTE entity 30 using the path selection entity 34 (step 406). Since the CMIP fields for the graft message matches the transient "MCTE state" created earlier, the graft message is diverted to the MCTE entity 30, which sends the graft message (step 407) to the next hop 10 listed in the ERO (or returned by the path selection entity 34).

Note that the CMIP fields need only be configured at the joining node 6a, intermediate network elements are informed of the CMIP information by graft messages received from previous hops. Similarly, the explicit (constraint) routes are only configured at the ingress node 4 (or SLS database server 22); intermediate network elements 12 learn of the explicit routes via the ERO propagated from the joining node 6a as part of the graft message. A Loose Source Route can be specified in the ERO and intermediate network elements 12 may thus forward the graft message to the next explicit network element 12 specified in the ERO based on routing information locally saved in the network element 12.

It will be seen that, because the distribution path is constructed from the joining node 6a back toward the ingress node 4, and service resources appropriate to the SLS are allocated as each path segment 16 is added to the path, no data traffic is sent toward the joining node 6a until the entire distribution path has been constructed and provisioned. This avoids the problems in the prior art associated with data traffic being sent over a distribution path in which one or more downstream segments 16 (or network elements 12) is unable to allocate sufficient resources, thereby requiring that data-packets be re-labeled or discarded at network elements 12 intermediate the ingress 4 and egress nodes 6.

If, at any hop 10, the network element 12 or link 14 lack sufficient available resources to satisfy the SLS, then the entire distribution path is preferably dismantled and the process re-started, possibly with a goal of joining a different group 20.

The embodiments of the invention described above and illustrated in FIG. 1 include dynamic multicast groups 20a–b each of which has a single ingress node 4. However, it should be understood that a dynamic multicast group 20 may have multiple ingress nodes 4. Similarly, a single egress node 6a could join more than one group 20. In such cases, the method of adding path segments 16 for each hop 10 of the distribution path is the same as that described with reference to FIG. 2. However, the total amount of resources which must be allocated for each segment 16 of the path must be sufficient to accommodate the total traffic flowing to the joining node 6a from all sources (ingress nodes 4). The MCTE entity 8 of the joining node 6a can obtain information respecting the total resources required for a multicast group 20 by:

a) sending a query message (with Router Alert) towards the root of the multicast tree. Each ingress node 4 will intercept the query message and respond with the amount of resources required for that ingress node; and     b) sending a resource query message for the group, to all ingress nodes 4 (which are assigned to a well-known multicast address) and/or to an SLS repository server 22. The ingress nodes 4 or server 22 will respond with a message including the resources required for each ingress node 4 of the group 20.

Upon receipt of the response messages from the ingress nodes 4 and/or the server 22, the MCTE entity 8 can calculate the total amount of resources that need to be provisioned (e.g. the sum of the resource requirements obtained in a) and b) above). This provides a universal query messaging method that can be used by an MCTE entity 8 of a joining node 6a to obtain the resource requirement for provisioning the distribution path, independent of the number (or location) of ingress nodes 4 of the group 20.

The description presented in the above sections assumes that all ingress nodes 4 for a multicast group 20 are known a priori, and that SLAs have been negotiated prior to the setup of the multicast tree for the group. However, for a fully functional system it is necessary to provide a mechanism that will address a situation in which a new ingress node 4 is requested to send data to an existing multicast group 20, but does not have an SLS for that group.

This can be handled in a relatively simple way because the resources required for the new ingress node 4 can be provisioned along existing distribution paths of the multicast tree. When a new ingress node 4 is added to a multicast group 20, the ingress node 4 may request (e.g. from the SLS repository 22) an existing service level specification for the multicast group 20. The request may be dynamically performed, or performed as an off-line process. The ingress node 4 then attempts to provision resources for the new ingress traffic class by sending a multicasting resource provisioning message to the multicast group. If the resource request by the new ingress node 4 cannot be met by any portion (e.g. network element 12 or link 14) of the multicast tree, the service request can be demoted or denied. Thus resources are allocated for a traffic class rather than a dynamic multicast group 20, as is common practice in resource allocation protocols such as Resource Reservation Protocol (RSVP).

The embodiments of the invention described above are intended to be exemplary only. The scope of the invention is therefore intended to be limited solely by the scope of the appended claims.

I claim:

1. A method of provisioning a distribution path of a multicast tree from an egress node in a dynamic multicast group in a differentiated services (DS) network, the method comprising the steps of:
   a) receiving information respecting a predetermined service level specification (SLS) for the dynamic multicast group at the egress node; and
   b) provisioning the distribution path from the egress node toward a root of the multicast tree, on the basis of the received information respecting the SLS.

2. A method as claimed in claim 1, wherein the information respecting the SLS is a resource requirement for the distribution path.

3. A method as claimed in claim 1, wherein the step of receiving information respecting the SLS comprises a step of receiving, at the egress node, a message including the information respecting the SLS.

4. A method as claimed in claim 3, further comprising the steps of:
   a) receiving a query message from the egress node; and
   b) subsequently sending a response to the query message, the response including the information respecting the SLS.

5. A method as claimed in claim 4, wherein the query message is received at one or more of an ingress node and an SLS database server.

6. A method as claimed in claim 1, wherein the step of provisioning a distribution path comprises a step of provisioning each hop of the path, in sequence, starting from the egress node and progressing toward the root of the multicast tree.

7. A method as claimed in claim 6, wherein the step of provisioning each hop of the path comprises the steps of:
   a) forwarding a graft message toward the root of the multicast tree;
   b) receiving the graft message at a network element intermediate an ingress node and the egress node; and
   c) allocating resources of the network element to the distribution path.

8. A method as claimed in claim 7, further comprising a step of setting a forwarding state of the network element to thereby enable forwarding of multicast traffic toward the egress node.

9. A method as claimed in claim 7, wherein the graft message is forwarded from the egress node toward the root of the multicast tree along a route traversed by the distribution path as its is provisioned.

10. A method as claimed in claim 9, wherein the route is determined in accordance with any one or more of:
    a) a shortest path route between the egress node and the ingress node;
    b) a constraint based routing (CBR) table including predetermined path routing information defined by a network provider;
    c) an explicit routing object (ERO) including predetermined path routing information defined by a network provider; and
    d) a path discovery algorithm.

11. A method as claimed in claim 10, wherein information respecting the route is determined by the egress node and included in the graft message.

12. A method as claimed in claim 7, further comprising, when the network element is carrying multicast traffic of the multicast group, the steps of:
    a) setting a forwarding state of the network element to enable forwarding of the multicast traffic to the egress node; and
    b) terminating the graft message.

13. A method as claimed in claim 1, further comprising, when a second ingress node joins the dynamic multicast group, the steps of:
    a) obtaining information respecting the predetermined service level specification (SLS) for the dynamic multicast group; and
    b) re-provisioning the distribution path, from the second ingress node toward each egress node of the dynamic multicast group, on the basis of the received information respecting the SLS.

14. A method as claimed in claim 13, wherein the step of obtaining information respecting the SLS comprises a step of sending a query message to one or more of a first ingress node and an SLS database server.

15. A method as claimed in claim 13, wherein the step of re-provisioning the distribution path comprises allocating additional resources to each path segment forming the distribution path between the second ingress node and a respective egress node.

16. An edge node for receiving a multicast traffic of a dynamic multicast group transmitted over a differentiated services (DS) network from an ingress node, the edge node comprising a multicast traffic engineering (MCTE) entity adapted for:
    a) receiving information respecting a predetermined service level specification (SLS) of the dynamic multicast group; and
    b) provisioning a distribution path from the edge node back to the ingress node, on the basis of the received information respecting the SLS.

17. An edge node as claimed in claim 16, further comprising:
   a) a path selection entity adapted to select a route along which the distribution path is provisioned; and
   b) a traffic configuration table adapted for storing information respecting the selected route.

18. An edge node as claimed in claim 16, wherein the MCTE entity is adapted to receive a message including the information respecting the SLS.

19. An edge node as claimed in claim 16, wherein the MCTE entity is adapted to send a query message requesting the information respecting the SLS.

20. An edge node as claimed in claim 19, wherein the MCTE entity is adapted to send the query message to any one or more of the ingress node and an SLS database server.

21. An edge node as claimed in claim 16, wherein the MCTE entity is adapted to forward a graft message toward a root of the multicast tree.

22. An edge node as claimed in claim 21, wherein the MCTE entity is adapted to forward the graft message toward the root of the multicast tree along a route traversed by the distribution path as its is provisioned.

23. An edge node as claimed in claim 22, wherein the path selection entity is adapted to determine the route in accordance with any one or more of:
   a) a shortest path route between the egress node and the ingress node;
   b) a constraint based routing (CBR) table including predetermined path routing information defined by a network provider;
   c) an explicit routing object (ERO) including predetermined path routing information defined by a network provider; and
   d) a path discovery algorithm.

24. An edge node as claimed in claim 23, wherein the MCTE entity is adapted to include information respecting the route in the graft message.

25. A system for provisioning a distribution path of a dynamic multicast group over a differentiated services (DS) network, the system comprising:
   a) an ingress node adapted to serve as a source of data for the dynamic multicast group; and
   b) an egress node adapted to serve as a sink for the data of the dynamic multicast group, the egress node comprising a multicast traffic engineering (MCTE) entity adapted to:
      i) receive information respecting a predetermined service level specification (SLS) of the dynamic multicast group; and
      ii) provision a distribution path from the egress node back to the ingress node, on the basis of the received information respecting the SLS.

26. A system as claimed in claim 25, wherein the information respecting the SLS is a resource requirement for the distribution path.

27. A system as claimed in claim 25, wherein the MCTE entity is adapted for receiving a message including the information respecting the SLS.

28. A system as claimed in claim 27, wherein the ingress node comprises:
   a) means for receiving a query message from the egress node; and
   b) means for sending a response to the message, the response including the information respecting the SLS.

29. A system as claimed in claim 25, wherein the MCTE entity is adapted for provisioning each hop of the path, in sequence, starting from the egress node and progressing toward the ingress node.

30. A system as claimed in claim 29, wherein the MCTE entity is adapted for forwarding a graft message toward a root of the multicast tree.

31. A system as claimed in claim 30, further comprising a network element intermediate the ingress node and the egress node, the network element comprising a respective traffic engineering (TE) entity adapted to;
   a) receive the graft message; and
   b) allocate resources of the network element to the distribution path in accordance with information included in the graft message.

32. A system as claimed in claim 31, wherein the MCTE entity is further adapted to set a forwarding state of the network element to thereby enable forwarding of multicast traffic toward the egress node.

33. A system as claimed in claim 31, wherein the MCTE entity of the egress node and the TE entity of the network element are adapted to forward the graft message toward the root of the multicast tree along a route traversed by the distribution path as its is provisioned.

34. A system as claimed in claim 33, wherein the egress node further comprises a path selection entity adapted to select the route in accordance with any one or more of:
   a) a shortest path route between the egress node and the ingress node;
   b) a constraint based routing (CBR) table including predetermined path routing information defined by a network provider;
   c) an explicit routing object (ERO) including predetermined path routing information defined by a network provider; and
   d) a path discovery algorithm.

35. A system as claimed in claim 34, wherein the MCTE entity of the egress node is adapted to include information of the route in the graft message.

36. A system as claimed in claim 31, wherein, when the network element is carrying multicast traffic of the multicast group, the TE entity of the network element is further adapted to:
   a) set a forwarding state of the network element to enable forwarding of the multicast traffic to the egress node; and
   b) terminate the graft message.

* * * * *